United States Patent
Nakasato

(10) Patent No.: US 8,520,614 B2
(45) Date of Patent: Aug. 27, 2013

(54) COMMUNICATION METHOD, BASE STATION APPARATUS, AND TERMINAL APPARATUS USING THE COMMUNICATION METHOD

(75) Inventor: Yuki Nakasato, Gifu (JP)

(73) Assignee: Kyocera Corporation, Kyoto (JP)

( * ) Notice: Subject to any disclaimer, the term of this patent is extended or adjusted under 35 U.S.C. 154(b) by 299 days.

(21) Appl. No.: 12/809,040

(22) PCT Filed: Dec. 4, 2008

(86) PCT No.: PCT/JP2008/003602
§ 371 (c)(1),
(2), (4) Date: Nov. 8, 2010

(87) PCT Pub. No.: WO2009/078134
PCT Pub. Date: Jun. 25, 2009

(65) Prior Publication Data
US 2011/0051675 A1    Mar. 3, 2011

(30) Foreign Application Priority Data
Dec. 18, 2007   (JP) ................................. 2007-326275

(51) Int. Cl.
*H04B 7/208* (2006.01)
(52) U.S. Cl.
USPC .......................... 370/329; 370/319; 370/348
(58) Field of Classification Search
USPC ................. 370/203–211, 328–344; 455/450, 455/464, 509
See application file for complete search history.

(56) References Cited

U.S. PATENT DOCUMENTS

| | | | | |
|---|---|---|---|---|
| 2008/0298315 A1* | 12/2008 | Ihm et al. | | 370/329 |
| 2010/0046413 A1* | 2/2010 | Jin et al. | | 370/315 |
| 2010/0074359 A1* | 3/2010 | Tanigawa et al. | | 375/267 |
| 2010/0296477 A1* | 11/2010 | Hason et al. | | 370/330 |

OTHER PUBLICATIONS

IEEE 802.16e-2005 Standard.*
ARIB Standard RCR STD-28-1 "Personal Handy Phone System", Version 4.1 (1/2), pp. 10-12.
International Search Report for PCT/JP2008/003602, mailed on Jan. 27, 2009, 2 pages.
International Preliminary Report on Patentability for PCT/JP2008/003602, issued on Jul. 20, 2010, 6 pages.

* cited by examiner

*Primary Examiner* — Michael Thier
*Assistant Examiner* — Brian Cox
(74) *Attorney, Agent, or Firm* — Duane Morris LLP

(57) ABSTRACT

An assigning unit defines multiple subchannels that are frequency-division multiplexed and assigns, to at least one terminal apparatus, two or more subchannels for each of the downlink and uplink symmetrically. The assigning unit includes discontinuous subchannels in the subchannels assigned for each of the downlink and uplink. A modulator and a transmitter transmit a multicarrier signal to a terminal apparatus. A receiver and a demodulator receive a single carrier signal from a terminal apparatus. The receiver and demodulator use one or more continuous subchannels among two or more subchannels in the uplink by switching those two or more subchannels.

4 Claims, 8 Drawing Sheets

FIG.4

| | | | | | |
|---|---|---|---|---|---|
| 1 | | | GS | | |
| 2 | | SS | DS | | DS |
| 3 | | SS | DS | | DS |
| 4 | | SS | DS | ……… | DS |
| 5 | | SS | DS | | DS |
| 6 | | SS | DS | | DS |
| 7 | | SS | DS | | DS |
| 8 | TS | | PS | | |
| 9 | | SS | DS | | DS |
| 10 | | SS | DS | | DS |
| 11 | | SS | DS | ……… | DS |
| 12 | | SS | DS | | DS |
| 13 | | SS | DS | | DS |
| 14 | | SS | DS | | DS |
| 15 | | | GS | | | GT |
| 16 | | SS | DS | | DS |
| 17 | | SS | DS | | DS |
| 18 | | SS | DS | ……… | DS |
| 19 | | SS | DS | | DS |
| 20 | | SS | DS | | DS |
| 21 | | SS | DS | | DS |
| 22 | TS | | PS | | |
| 23 | | SS | DS | | DS |
| 24 | | SS | DS | | DS |
| 25 | | SS | DS | ……… | DS |
| 26 | | SS | DS | | DS |
| 27 | | SS | DS | | DS |
| 28 | | SS | DS | | DS |
| 29 | | | GS | | |

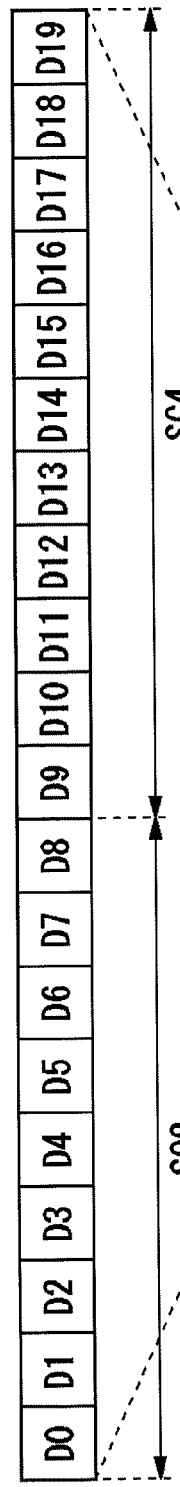

COMMUNICATION METHOD, BASE STATION APPARATUS, AND TERMINAL APPARATUS USING THE COMMUNICATION METHOD

This is a U.S. National Phase Application of International Application No. PCT/JP2008/003602 filed Dec. 4, 2008, which claims priority to Japanese Patent Application No. 2007-326275 filed Dec. 18, 2007, the disclosures of which are incorporated herein by reference in their entirety.

TECHNICAL FIELD

The present invention relates to a wireless communication technique, and particularly to a communication method for assigning a channel to a terminal apparatus to be communicated with, along with a base station apparatus and a terminal apparatus using the communication method.

BACKGROUND ART

In mobile communication systems including second generation cordless telephone systems, a logical control channel (hereinafter, referred to as an "LCCH") is defined. A base station apparatus (CS: Cell Station) assigns a time slot, which is a unit of communication, to a terminal apparatus (PS: Personal Station) so as to perform communication. When the number of group divisions is eight, a conventional LCCH consists of a broadcast control channel (hereinafter, referred to as a "BCCH"), eight paging channels (hereinafter, referred to individually as a "PCH"), and three signaling control channels (hereinafter, referred to individually as an "SCCH"), i.e., 12 channels in total. A base station apparatus transmits each channel intermittently at intervals of twenty frames (see Non-Patent Document 1, for example). One frame consists of eight time slots.
[Non-Patent Document 1] ARIB STANDARD RCR STD-28-1 "PERSONAL HANDY PHONE SYSTEM", VERSION 4.1 (1/2)

DISCLOSURE OF THE INVENTION

Problem to be Solved by the Invention

In order to increase the communication capacity of a base station apparatus in a mobile communication system as described above, the base station apparatus performs Orthogonal Frequency Division Multiple Access (OFDMA). For example, multiple subchannels are multiplexed on a frequency axis using OFDMA, and a base station apparatus assigns a subchannel to a terminal apparatus. The base station apparatus assigns multiple subchannels to a terminal apparatus that requires a high data transmission rate. Since a signal obtained through OFDM (hereinafter, referred to as an "OFDM signal") is handled on each subchannel, the base station apparatus may assign non-adjacent subchannels, i.e., discontinuous subchannels, to a single terminal apparatus.

In such a situation, the base station apparatus may assign a subchannel to a terminal apparatus that is unable to transmit an OFDM signal but transmits a single carrier signal. Such a terminal apparatus transmits a single carrier signal (hereinafter, referred to as an "SC signal") on an assigned subchannel. Accordingly, when assigning multiple subchannels to such a terminal apparatus, the base station apparatus should assign continuous subchannels thereto. However, continuous subchannels might be unavailable depending on the status of use of subchannels. In this case, if a high data transmission rate is required only for the downlink, the base station apparatus will assign multiple discontinuous subchannels to the terminal apparatus to transmit OFDM signals.

In the uplink, on the other hand, there is an unused subchannel. Meanwhile, the execution of carrier sense is required in a mobile communication system; when signal transmission is not detected on a certain subchannel for a predetermined carrier sense period, such a subchannel is considered to be unused. Accordingly, another base station apparatus will use the subchannel, and, as a result, signal collision will occur on the subchannel in the uplink.

The present invention has been made in view of such a situation, and a purpose thereof is to provide a technique by which, when a terminal apparatus dealing with a single carrier signal is assigned to discontinuous subchannels, such a single carrier signal is detected by carrier sense.

Means for Solving the Problem

To solve the problem above, a base station apparatus of an embodiment of the present invention comprises: a control unit configured to define a plurality of frequency-division multiplexed subchannels and to assign, to at least one terminal apparatus, two or more subchannels for each of the downlink and uplink symmetrically; and a communication unit configured to transmit a multicarrier signal to a terminal apparatus on a subchannel assigned for the downlink by the control unit, and to receive a single carrier signal from a terminal apparatus on a subchannel assigned for the uplink by the control unit. When assigning two or more subchannels for each of the downlink and uplink, the communication unit includes discontinuous subchannels therein. The communication unit uses one or more continuous subchannels among two or more subchannels in the uplink by switching those two or more subchannels.

Another embodiment of the present invention is a terminal apparatus. For the terminal apparatus, a plurality of frequency-division multiplexed subchannels are defined, and the terminal apparatus is assigned two or more subchannels by a base station apparatus for each of the downlink and uplink symmetrically. The terminal apparatus comprises: a receiver configured to receive a multicarrier signal from a base station apparatus on a subchannel assigned for the downlink; and a transmitter configured to transmit a single carrier signal to a base station apparatus on a subchannel assigned for the uplink. The transmitter uses one or more continuous subchannels among two or more subchannels assigned including discontinuous subchannels, by switching those two or more subchannels.

Yet another embodiment of the present invention is a communication method. The method comprises: defining a plurality of frequency-division multiplexed subchannels and assigning, to at least one terminal apparatus, two or more subchannels for each of the downlink and uplink, symmetrically, so that those two or more subchannels include discontinuous subchannels; transmitting a multicarrier signal to a terminal apparatus on a subchannel assigned for the downlink; and receiving a single carrier signal from a terminal apparatus on a subchannel assigned for the uplink, using one or more continuous subchannels among two or more subchannels in the uplink by switching those two or more subchannels.

Still yet another embodiment of the present invention is also a communication method. In the communication method, a plurality of frequency-division multiplexed subchannels are defined and two or more subchannels are assigned by a base station apparatus for each of the downlink and uplink symmetrically. The communication method comprises: receiving a multicarrier signal from a base station apparatus on a subchannel assigned for the downlink; and transmitting a single carrier signal to a base station apparatus on a subchannel assigned for the uplink, using one or more continuous subchannels among two or more subchannels assigned including discontinuous subchannels by switching those two or more subchannels.

Optional combinations of the aforementioned constituting elements, and implementations of the invention in the form of methods, apparatuses, systems, recording media, and computer programs may also be practiced as additional modes of the present invention.

ADVANTAGEOUS EFFECTS

The present invention enables the detection of a single carrier signal by carrier sense when a terminal apparatus dealing with such a single carrier signal is assigned to discontinuous subchannels.

BRIEF DESCRIPTION OF THE DRAWINGS

FIG. 4 is a diagram that shows a configuration of subchannel blocks in the communication system shown in FIG. 1;

FIGS. 8A-8B are diagrams that show an example of subchannel assignment according to a modification of the present invention.

Figure 1:
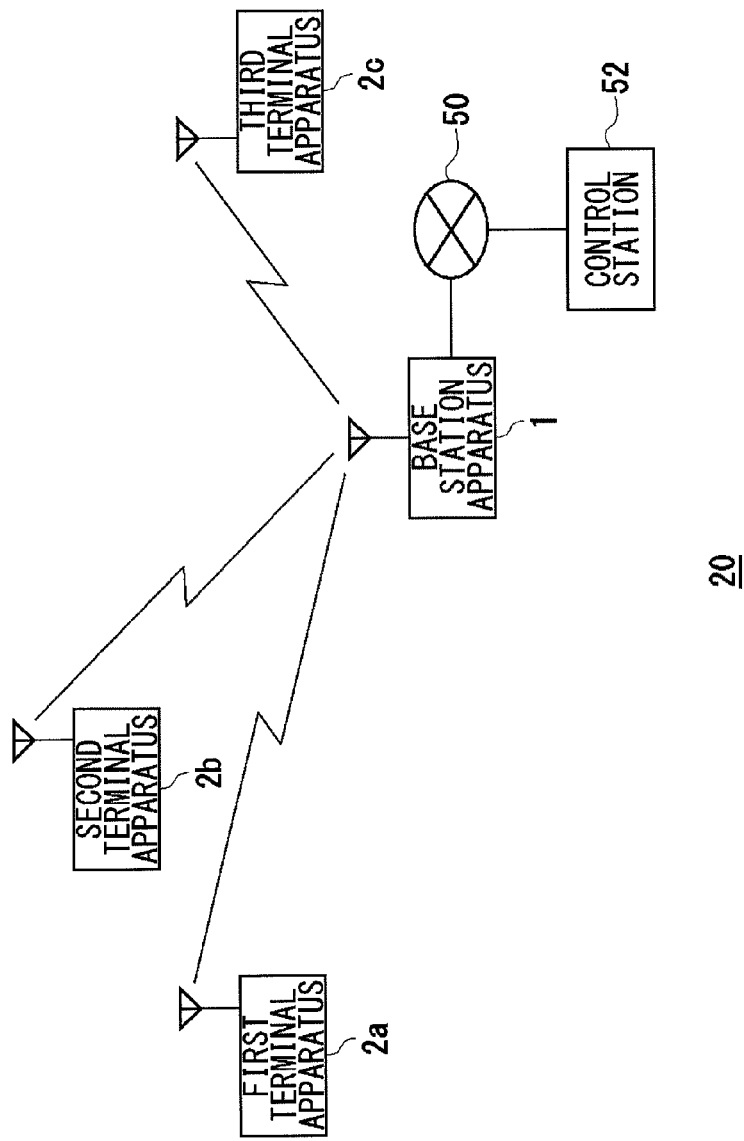
FIG. 1 is a diagram that shows a configuration of a communication system according to an embodiment of the present invention.

EXPLANATION OF REFERENCE NUMERALS 1 base station apparatus
2 terminal apparatus
20 communication system
52 control station
100 antenna
101 radio unit
102 transmitter
103 modulator
104 receiver
105 demodulator
106 IF unit
107 control unit
110 ranging processing unit
112 assigning unit
150 antenna
152 radio unit
154 transmitter
156 modulator
158 receiver
160 demodulator
162 IF unit
164 control unit

BEST MODE FOR CARRYING OUT THE INVENTION

A general description will be given before the present invention is specifically described. An embodiment of the present invention relates to a communication system comprising a base station apparatus and terminal apparatuses. In a communication system, each frame consists of multiple time slots that are time-division multiplexed, and each of the time slots falls into either a downlink time slot or an uplink time slot. Each time slot consists of multiple subchannels that are frequency-division multiplexed, and each subchannel is provided with a multicarrier signal. In the present embodiment, an OFDM signal is used as a multicarrier signal, and OFDMA is employed as frequency division multiplexing. Hereinafter, a subchannel within a time slot is referred to as a "burst," and a signal placed on a burst is referred to as a "burst signal".

The base station apparatus assigns, to each terminal apparatus, bursts symmetrically for the uplink and downlink. Meanwhile, some terminal apparatuses receive OFDM signals and transmit SC signals, and such terminal apparatuses transmit SC signals using bursts assigned for the uplink. Hereinbelow, such a type of terminal apparatus is simply referred to as a terminal apparatus. It is assumed here that multiple subchannels, or multiple bursts, are to be assigned in response to a terminal apparatus's request, but there are no assignable adjacent subchannels. That is, the above corresponds to a case where, for example, two non-adjacent subchannels within a time slot are assigned. In such a case, an OFDM signal is transmitted on each of the two subchannels in the downlink.

In the uplink, on the other hand, an SC signal is transmitted on either of the subchannels. In such a situation, a carrier sense period is defined as "four frames," for example. Accordingly, when there is a burst on which no signal is detected throughout four frames, another base station apparatus considers the burst to be available. Consequently, one of the bursts in the uplink set forth above might be used by another base station apparatus. In order to prevent such a situation, a communication system according to the present embodiment performs processing as described below.

The base station apparatus switches the two bursts assigned for the uplink to receive an SC signal from the terminal apparatus. More specifically, the bursts are switched therebetween so that all the bursts are used within a carrier sense period. For instance, the burst on the lower frequency side is used for the first three frames of the four frames, and the burst on the higher frequency side is then used for the last frame. Such use pattern of bursts may be given by the base station apparatus to the terminal apparatus or may be voluntarily determined by the terminal apparatus. Meanwhile, the base station apparatus transmits OFDM signals on both of the two bursts assigned for the downlink.

FIG. 1 shows a configuration of a communication system 20 according to an embodiment of the present invention. The communication system 20 includes: a base station apparatus 1; a first terminal apparatus 2a, a second terminal apparatus 2b, and a third terminal apparatus 2c, which are collectively referred to as terminal apparatuses 2; a network 50; and a control station 52. Although three terminal apparatuses 2 are shown in FIG. 1, the number of terminal apparatuses may be two or less, or may be four or more. There are at least two types of terminal apparatuses 2: one is a terminal apparatus 2 that deals with OFDM signals both in the uplink and downlink; and the other is a terminal apparatus 2 that deals with OFDM signals in the downlink but deals with SC signals in the uplink. As stated previously, the latter type of terminal apparatus 2 is considered in the following description. There are other base station apparatuses 1 that are not illustrated in FIG. 1. Each of the multiple base station apparatuses 1 performs carrier sense, and, when a burst is detected on which no signal is detected throughout a carrier sense period, the base station apparatus determines that the burst is available.

The control station 52 is connected to the base station apparatus 1 via the network 50. The control station 52 performs location registration of a terminal apparatus 2. Location registration is performed to manage a paging area that includes a terminal apparatus 2. Since a publicly-known technique may be used therefor, a specific description of the location registration will be omitted here. The control station 52 also receives an incoming call notification for a terminal apparatus 2 using switching equipment or the like, which is not illustrated. The control station 52 then specifies the paging area that includes the terminal apparatus 2 for which the incoming call notification is provided, based on a result of the location registration. Thereafter, the control station 52 transmits the incoming call notification to a base station apparatus 1 that belongs to the paging area. The base station apparatus 1 that has received the incoming call notification generates a PCH as an incoming call signal for notifying the terminal apparatus 2 of the incoming call. The base station apparatus 1 then transmits the PCH, and processing will be performed between the base station apparatus 1 and terminal apparatus 2, by which the base station apparatus 1 assigns bursts to the terminal apparatus 2, though the explanation thereof is omitted here.

Figure 2:
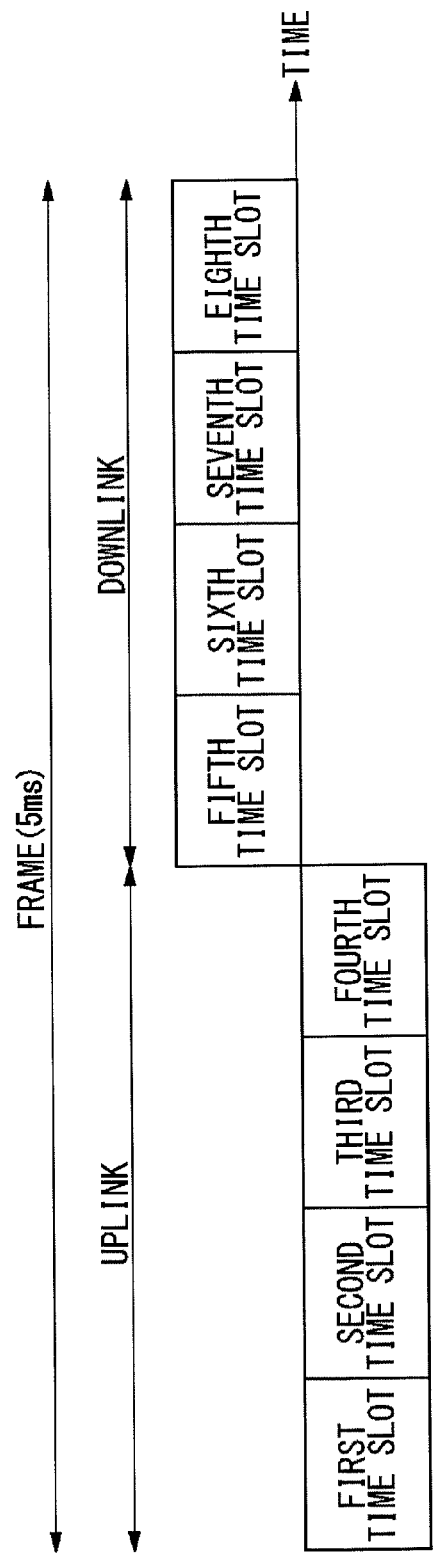
FIG. 2 is a diagram that shows a configuration of a TDMA frame in the communication system shown in FIG. 1.

FIG. 2 shows a configuration of a TDMA frame in the communication system 20. In the communication system 20, a frame consists of four time slots for uplink communication and four time slots for downlink communication. Frames are successively arranged. In the present embodiment, the assignment of time slots for uplink communication is performed in the same way as the assignment of time slots for downlink communication, i.e., time slots for the uplink and those for the downlink are symmetrically assigned. Accordingly, in the following, a description may be given only with regard to downlink communication for the sake of convenience.

Figure 3:
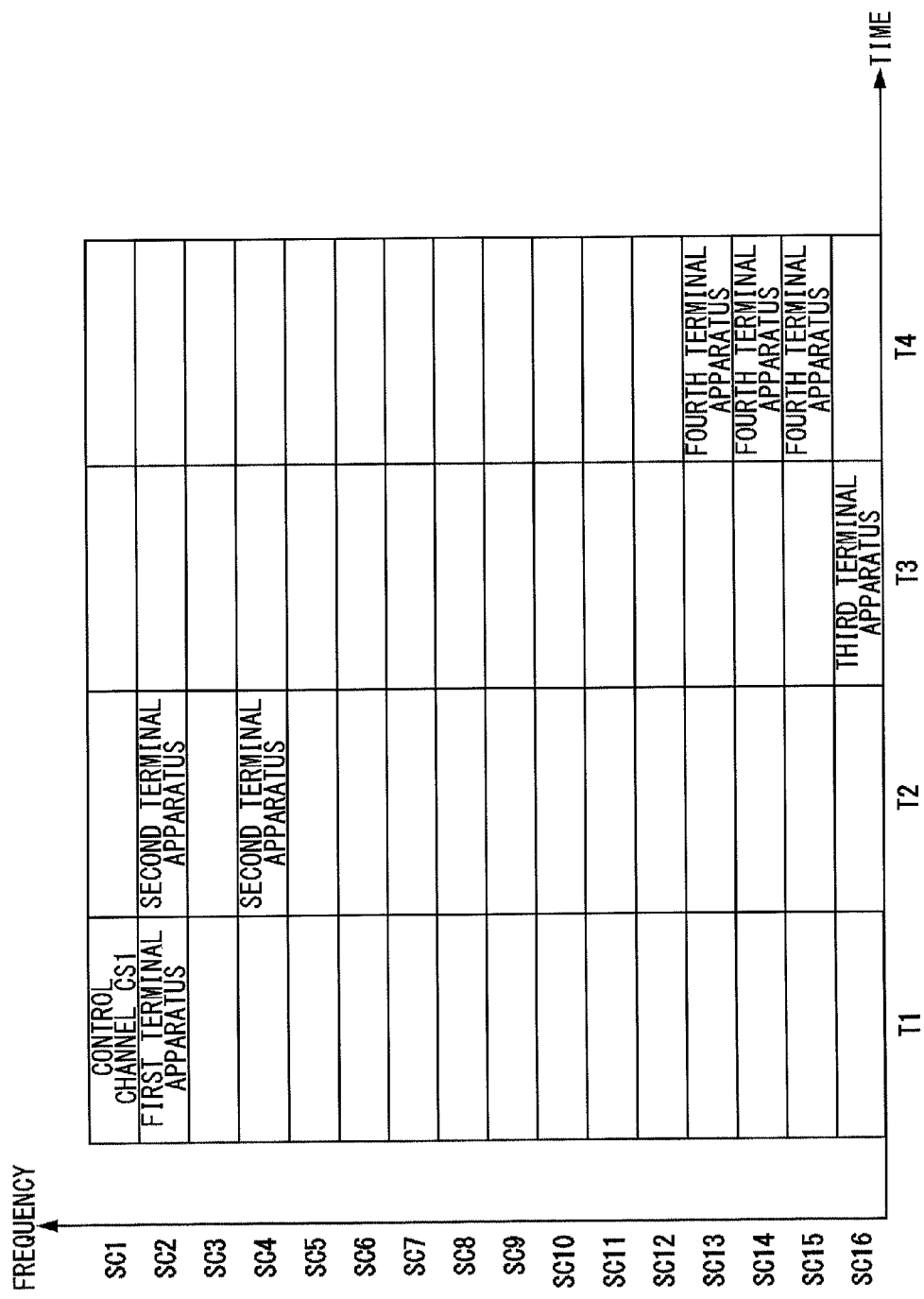
FIG. 3 is a diagram that shows a configuration of subchannels in the communication system shown in FIG. 1.

FIG. 3 shows a configuration of subchannels in the communication system 20. Besides TDMA as described above, the base station apparatus 1 also applies OFDMA as shown in FIG. 3. Accordingly, multiple terminal apparatuses 2 are assigned within a single time slot. In FIG. 3, the time slot arrangement is provided on a time axis in the direction of the horizontal axis, while the subchannel arrangement is provided on a frequency axis in the direction of the vertical axis. In other words, the multiplexing on the horizontal axis corresponds to TDMA, and the multiplexing on the vertical axis corresponds to OFDMA. FIG. 3 illustrates the first time slot (denoted by "T1" in the figure) through the fourth time slot (denoted by "T4" in the figure) included in a frame. For example, T1 through T4 in FIG. 3 correspond to the fifth through eighth time slots in FIG. 2, respectively.

Each time slot includes the first subchannel (denoted by "SC1" in the figure) through the sixteenth subchannel (denoted by "SC16" in the figure). A combination of one time slot and one subchannel corresponds to a "burst" described above. In FIG. 3, the first terminal apparatus 2*a* is assigned to the second subchannel in the first time slot, and the second terminal apparatus 2*b* is assigned to the second and fourth subchannels in the second time slot. Also, the third terminal apparatus 2*c* is assigned to the sixteenth subchannel in the third time slot, and the fourth terminal apparatus 2*d* is assigned to the thirteenth through fifteenth subchannels in the fourth time slot. Thus, the second terminal apparatus 2*b* is assigned two subchannels, but they are not adjacent on the frequency axis, i.e., they are discontinuous subchannels.

Further, the first subchannels in FIG. 3 are designated as subchannels exclusive to control channels. A control channel is a subchannel occupied by a control signal and is defined separately from a subchannel occupied by a data signal. A control channel includes a broadcasting signal and a paging signal. In FIG. 3, a first base station apparatus 1*a* assigns a control channel to the first subchannel in the first time slot. When only SC1 is focused on, the frame configuration and a group of multiple frames corresponds to an LCCH.

FIG. 4 shows a configuration of subchannel blocks in the communication system 20. A subchannel block corresponds to a radio channel specified by a time slot and a subchannel and also corresponds to a burst described previously. In FIG. 4, the horizontal direction represents a time axis, while the vertical direction represents a frequency axis. The numbers "1" to "29" in the figure denote the numbers of subcarriers. Thus, subchannels are provided with OFDM multicarrier signals. In FIG. 4, "TS" denotes a training symbol and includes a known signal such as an "STS", a symbol for synchronization detection, and an "LTS", a symbol for estimation of channel characteristics, both of which are not illustrated in the figure. The "GS" denotes a guard symbol in which no effective signal is provided. The "PS" denotes a pilot symbol, which is configured with a known signal. The "SS" denotes a signal symbol in which a control signal is provided. The "DS" denotes a data symbol that corresponds to data to be transmitted. The "GT" denotes guard time in which no effective signal is provided.

Figure 5:
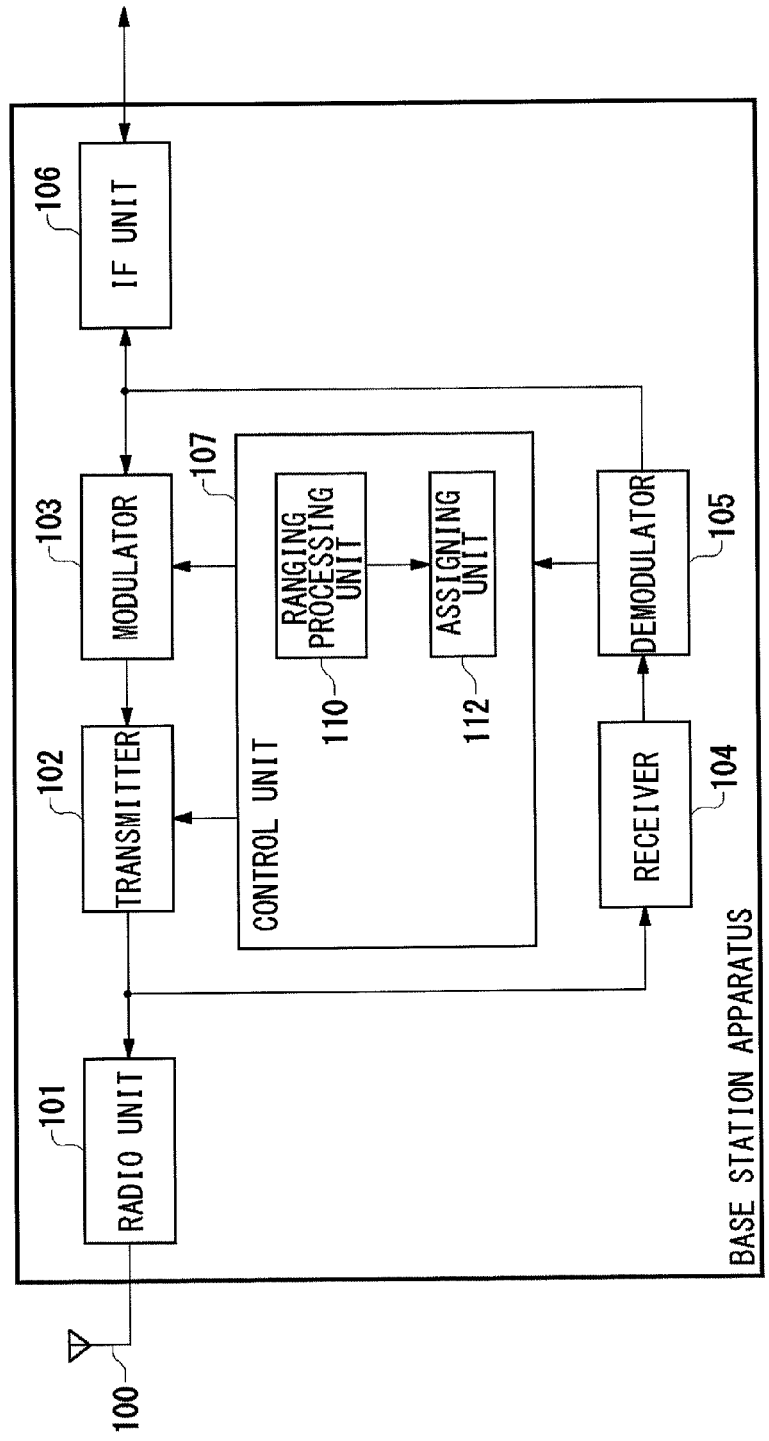
FIG. 5 is a diagram that shows a configuration of the base station apparatus shown in FIG. 1.

FIG. 5 shows a configuration of the base station apparatus 1. The base station apparatus 1 comprises an antenna 100, a radio unit 101, a transmitter 102, a modulator 103, a receiver 104, a demodulator 105, an IF unit 106, and a control unit 107. The control unit 107 includes a ranging processing unit 110 and an assigning unit 112. The antenna 100 transmits and receives a radio frequency signal. To the radio frequency signal here can be applied the theory of FIGS. 2 through 4. As reception processing, the radio unit 101 converts the frequency of a radio frequency signal received by the antenna 100 to derive a baseband signal and outputs the resulting signal to the receiver 104. Also, as transmission processing, the radio unit 101 converts the frequency of a baseband signal transmitted by the transmitter 102 to derive a radio frequency signal and outputs the resulting signal to the antenna 100. Although a baseband signal should be indicated by two signal lines because it generally consists of an in-phase component and a quadrature component, the signal is indicated by a single signal line in FIG. 5 in the interest of clarity.

The transmitter 102 converts a frequency domain signal transmitted by the modulator 103 into a time domain signal and outputs the resulting signal to the radio unit 101. For the conversion from a frequency domain signal into a time domain signal, an IFFT (Inversed Fast Fourier Transform) is used. The modulator 103 modulates an input from the IF unit 106 and outputs the resulting signal to the transmitter 102. As a modulation scheme therefor, BPSK (Binary Phase Shift Keying), QPSK (Quadrature Phase Shift Keying), 16QAM (Quadrature Amplitude Modulation), 32QAM, 64QAM, 256QAM, or the like is used. In this way, the modulator 103 and transmitter 102 transmit an OFDM signal to a terminal apparatus 2, not illustrated, using a burst assigned for the downlink by the control unit 107, which will be described later.

The receiver 104 converts a time domain signal transmitted by the radio unit 101 into a frequency domain signal and outputs the resulting signal to the demodulator 105. For the conversion from a time domain signal into a frequency domain signal, an FFT (Fast Fourier Transform) is used. The receiver 104 also has a function to directly output to the demodulator 105 a time domain signal transmitted by the radio unit 101 without converting it. Such processing is performed when the time domain signal is an SC signal. The demodulator 105 demodulates an input from the receiver 104 and outputs the resulting signal to the IF unit 106. On this occasion, demodulation corresponding to the modulation is performed. The demodulator 105 demodulates an input from the receiver 104 and outputs the resulting signal to the IF unit 106 also when the time domain signal is an SC signal. In this way, the receiver 104 and demodulator 105 receive an OFDM signal from a terminal apparatus 2, not illustrated, using a burst assigned for the uplink by the control unit 107, which will be described later, and also receive an SC signal from another terminal apparatus 2, also not illustrated.

The IF unit 106 is connected to a network, not illustrated, and outputs to the network, as reception processing, a signal demodulated by the demodulator 105. Also, as transmission processing, the IF unit 106 receives data from the network and outputs it to the modulator 103. Furthermore, the IF unit 106 accepts an incoming call notification from the control station 52, not illustrated, via the network 50, also not illustrated. The IF unit 106 then outputs the incoming call notification thus accepted to the control unit 107.

The control unit 107 performs the overall timing control for the base station apparatus 1. The control unit 107 also controls carrier sense processing, but the explanation thereof is omitted here. The ranging processing unit 110 performs ranging processing for a terminal apparatus 2, which is not illustrated. Ranging processing is processing for allowing such terminal apparatus 2 to perform time synchronization, frequency synchronization, and transmission power control. In the embodiment, a publicly-known technique may be used for ranging processing. After the ranging processing unit 110 completes ranging processing, the assigning unit 112 receives an assignment request from the terminal apparatus 2 via the radio unit 101, receiver 104, and demodulator 105 and assigns bursts to the terminal apparatus 2 accordingly. The assigning unit 112 then transmits the assignment result to the terminal apparatus 2 via the modulator 103, transmitter 102, and radio unit 101.

The assigning unit 112 defines multiple subchannels that are frequency-division multiplexed, and further defines multiple time slots that are time-division multiplexed in each subchannel, as shown in FIGS. 2 through 4. The assigning unit 112 then assigns, to at least one terminal apparatus 2, two or more time slots for each of the downlink and uplink, symmetrically. More specifically, for example, the assigning unit 112 assigns SC2 and SC4 in the second time slot for the uplink, and assigns SC2 and SC4 in the sixth time slot for the downlink. Hereinbelow, there will be described a case where, when two or more bursts are assigned for each of the downlink and uplink, discontinuous bursts on the frequency axis are included therein, as stated previously.

The receiver 104 and demodulator 105 use one or more bursts continuous on the frequency axis among two or more bursts in the uplink, by switching among those bursts. For instance, when two bursts that are not adjacent on the frequency axis are assigned by the assigning unit 112, the receiver 104 and demodulator 105 use the two bursts by switching them. The switching is performed so that all the bursts are used within a carrier sense period. When the carrier sense period is four frames, the two bursts are included within four frames. That is, in the uplink, the receiver 104 and demodulator 105 switch the subchannels for the terminal apparatus 2 in units of at least one burst signal assigned to the terminal apparatus 2.

Figure 6:
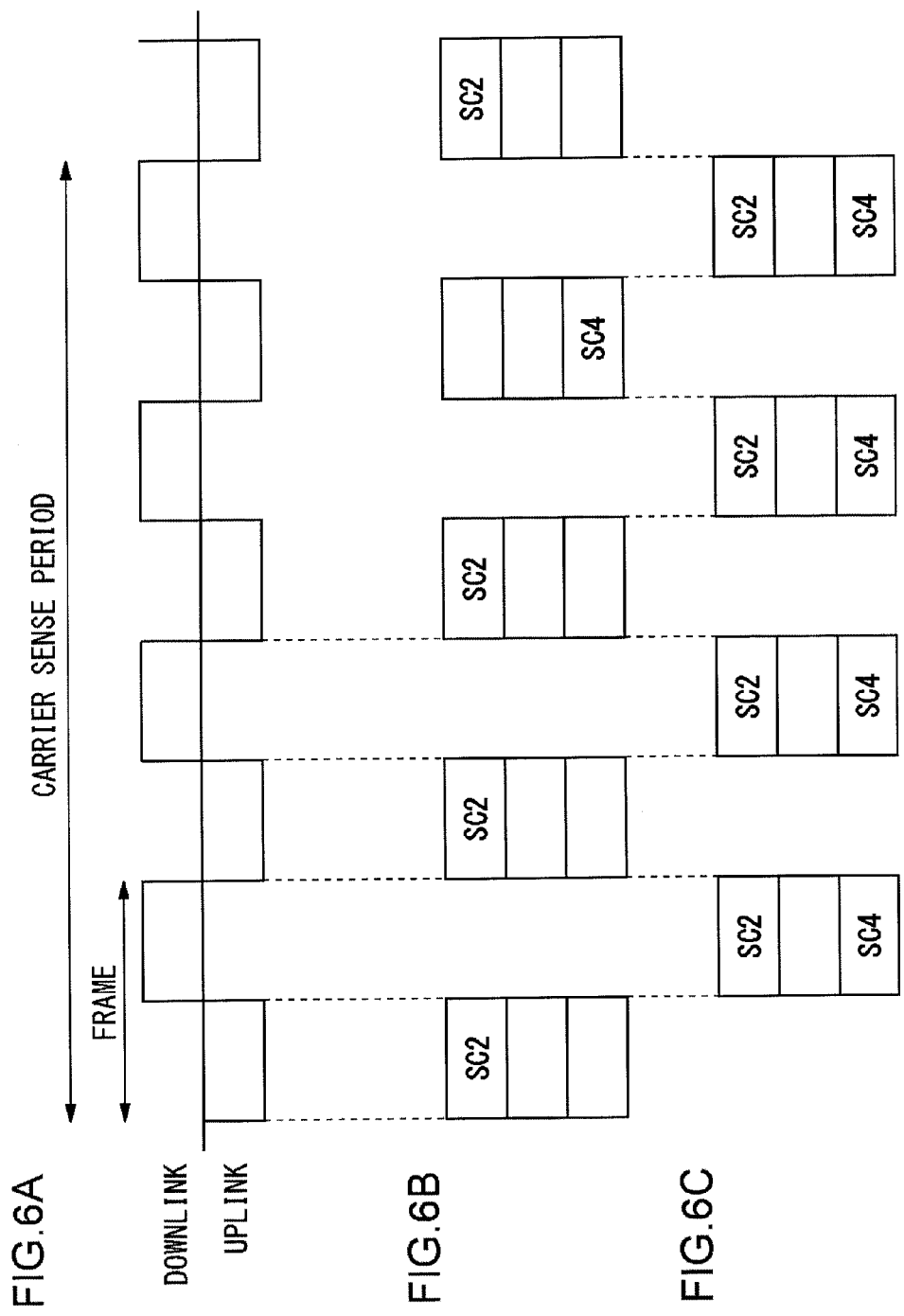
FIGS. 6A-6C are diagrams that show an example of subchannel assignment performed by the control unit shown in FIG. 5.

FIGS. 6A-6C show an example of subchannel assignment performed by the control unit 107. FIG. 6 show a configuration of continuous frames. The second terminal apparatus 2b in FIG. 3 is to be described here, and hence, the second and sixth time slots in the frame shown in FIG. 2 will be focused on. Accordingly, a combination of the second and sixth time slots is given as one frame in FIG. 6A. Also, four frames are indicated as a carrier sense period, as described previously. FIG. 6B shows subchannels assigned to the second terminal apparatus 2b for the uplink. During the four frames, subchannels are assigned in the order of "SC2", "SC2", "SC2", and "SC4". The same subchannel assignment is given in the subsequent four frames. FIG. 6C shows subchannels assigned to the second terminal apparatus 2b for the downlink. In the downlink, both "SC2" and "SC4" are concurrently used in all the frames. The description will now return to FIG. 5.

The control unit 107 may determine such a use pattern of bursts as shown in FIG. 6B. In such a case, the control unit 107 transmits the pattern thus determined to the terminal apparatus 2 via the modulator 103, transmitter 102, and radio unit 101. Alternatively, the terminal apparatus 2 may voluntarily determine the use pattern. In this case, the receiver 104 and demodulator 105 are prepared so as to receive an SC signal from the terminal apparatus 2 through both SC2 and SC4. The control unit 107 also compares the received power of SC2 with that of SC4 and determines that an SC signal is transmitted on the burst of which the received power is greater. The IF unit 106 then outputs the demodulation result in the burst on which the SC signal is considered to be transmitted.

The configuration above may be implemented by a CPU or the memory of any given computer, an LSI, or the like in terms of hardware, and by a memory-loaded program having a communication function or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 7:
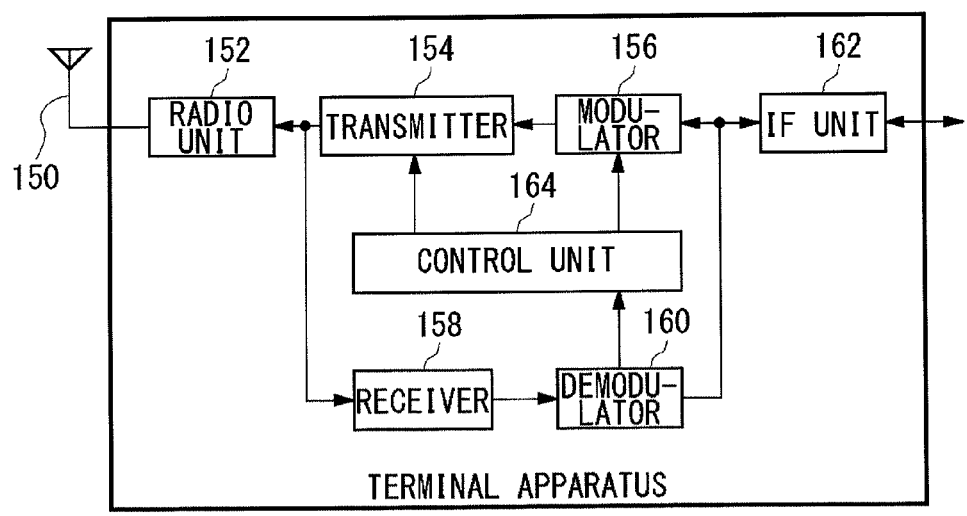
FIG. 7 is a diagram that shows a configuration of a terminal apparatus shown in FIG. 1.

FIG. 7 shows a configuration of a terminal apparatus 2. The terminal apparatus 2 comprises an antenna 150, a radio unit 152, a transmitter 154, a modulator 156, a receiver 158, a demodulator 160, an IF unit 162, and a control unit 164. The terminal apparatus 2 receives an OFDM signal in the downlink and transmits an SC signal in the uplink, as mentioned previously. That is, FIG. 7 depicts the second terminal apparatus 2b set forth above.

Also, as stated previously, there are defined multiple subchannels that are frequency-division multiplexed, and in each subchannel are arranged multiple time slots that are time-division multiplexed. The terminal apparatus 2 is assigned, by the base station apparatus 1, two or more subchannels for each of the downlink and uplink symmetrically. The antenna 150, radio unit 152, transmitter 154, modulator 156, receiver 158, and demodulator 160 perform processing corresponding to the processing performed by the antenna 100, radio unit 101, transmitter 102, modulator 103, receiver 104, and demodulator 105 shown in FIG. 5. Accordingly, a description will be given mainly of the differences from FIG. 5.

The radio unit 152, receiver 158, and demodulator 160 receive an OFDM signal from a base station apparatus 1, not illustrated, using a burst assigned for the downlink by the base station apparatus 1. Accordingly, an FFT or the like is performed in the same way as in FIG. 5. Meanwhile, the modulator 156, transmitter 154, and radio unit 152 transmit an SC signal to a base station apparatus 1, not illustrated, using a burst assigned for the uplink by the base station apparatus 1. Accordingly, unlike in FIG. 5, an IFFT or the like is not performed, and processing for transmitting an SC signal is performed. Since a publicly-known technique may be used for such processing, a specific description thereof will be omitted here.

The control unit 164 controls processing performed by the transmitter 154, modulator 156, and demodulator 160. For example, the control unit 164 controls the above units for ranging processing and burst assignment processing. The control unit 164 also controls the operation of the above units even after the communication with the base station apparatus 1 starts. Especially, when two or more bursts that are discontinuous on the frequency axis are assigned by the base station apparatus 1, as described previously, the control unit 164 uses one or more continuous bursts by switching those two or more bursts. Accordingly, the control unit 164 provides control so that the transmitter 154 and modulator 156 transmit an SC signal as shown in FIG. 6B. That is, the control unit 164 switches the bursts in units of at least one time slot assigned by the base station apparatus 1. In order to perform such processing, the control unit 164 receives a switching pattern from the base station apparatus 1 via the radio unit 152, receiver 158, and demodulator 160, and performs burst switching according thereto. Alternatively, the control unit 164 may voluntarily determine such a pattern.

There will now be described the operation performed by the communication system 20 having the configuration set forth above. The terminal apparatus 2 requests burst assignment from the base station apparatus 1. The base station apparatus 1 then assigns, to the terminal apparatus 2, SC2 and SC4 both in the second and sixth time slots. Thereafter, the base station apparatus 1 transmits to the terminal apparatus 2 OFDM signals on SC2 and SC4 in the downlink. The terminal apparatus 2 transmits to the base station apparatus 1 an SC signal on SC2 in the uplink. In the subsequent frames, the bursts are used in the order of SC2, SC2, and SC4.

In the following, a modification of the present invention will be described. As with the embodiment, it is assumed also in the modification that at least bursts are assigned to a terminal apparatus symmetrically for the uplink and downlink and such bursts are discontinuous on the frequency axis. Also, an OFDM signal is used in the downlink, while an SC signal is used in the uplink. In such a situation, in the embodiment, the bursts are switched in units of time slots so that all the assigned bursts are used to transmit SC signals within a carrier sense period. In the modification, on the other hand, bursts are switched within a time slot. Thus, the timing of switching bursts is different between the modification and the embodiment. The configurations of the base station apparatus 1 and terminal apparatus 2 according to the modification are of similar types to the configuration of the base station apparatus 1 shown in FIG. 5 and the configuration of the terminal apparatus 2 shown in FIG. 7. Accordingly, a description will be given mainly of the differences from the configurations.

The control unit 107 of the base station apparatus 1 allows the receiver 104 and demodulator 105 to switch bursts for the terminal apparatus 2 in the uplink, within a time slot assigned to the terminal apparatus 2. Namely, the burst on which an SC signal is transmitted is changed during a single time slot. The receiver 104 and demodulator 105 receive such an SC signal. As with the embodiment, the control unit 107 may instruct the terminal apparatus 2 in advance to perform such burst switching, or the terminal apparatus 2 may voluntarily perform the switching. A pilot is also placed at the top of the switching part, and the demodulator 105 estimates channel characteristics based on the pilot using a publicly-known technique.

The control unit 164 of the terminal apparatus 2 allows the modulator 156 and transmitter 154 to switch bursts in the uplink, within a time slot assigned to the base station apparatus 1. Namely, the burst on which an SC signal is transmitted is changed during a single time slot. The modulator 156 and transmitter 154 transmit such an SC signal. The modulator 156 places a pilot at the top of the switching part.

FIGS. 8A-8B show an example of subchannel assignment according to the modification of the present invention. The second terminal apparatus 2b in FIG. 3 will be described here, and two subchannels SC2 and SC4 are assigned within a time slot. FIGS. 8A-8B show the uplink case, i.e., the case where an SC signal is transmitted. FIG. 8A illustrates a format of an SC signal placed on a burst. As shown in the figure, an SC signal placed on a burst is divided into multiple blocks (hereinafter, each of the blocks is referred to as an "SC block").

The multiple SC blocks are denoted by "D0" through "D19". In the interest of clarity, it is assumed that the period of each SC block is identical. For instance, a known signal such as a preamble and a pilot is placed in "D0" and "D9". Accordingly, the modulator 156 and receiver 158 transmit the SC blocks "D0" through "D8" on SC2, and transmit the SC blocks "D9" through "D19" on SC4. The receiver 104 and demodulator 105 then operate in response thereto. FIG. 8B shows subchannels assigned to the second terminal apparatus 2b for the uplink. Within a single time slot, "SC2" and "SC4" are successively used.

There will now be described the operation performed by the communication system 20 having the configuration set forth above. The terminal apparatus 2 requests burst assignment from the base station apparatus 1. The base station apparatus 1 then assigns, to the terminal apparatus 2, SC2 and SC4 both in the second and sixth time slots. Thereafter, the base station apparatus 1 transmits to the terminal apparatus 2 OFDM signals on SC2 and SC4 in the downlink. The terminal apparatus 2 transmits, to the base station apparatus 1 in the uplink, an SC signal on SC2 in the anterior part of the second time slot and on SC4 in the posterior part of the time slot.

According to the embodiment of the present invention, since one or more continuous bursts are used by switching two or more bursts discontinuous on a frequency axis in the uplink, an SC signal can be detected by carrier sense. Also, since all assigned bursts are used within a carrier sense period, an SC signal can be detected by carrier sense. Since an SC signal is detected by carrier sense, the collision probability on the bursts can be reduced. Since the collision probability on a burst in the uplink is reduced, the collision probability on a burst in the downlink can be also reduced. Since the collision probability on a burst in the downlink is reduced, the communication capacity in the downlink can be ensured. Also, since burst switching is performed at least in units of time slots, the processing can be simplified. Alternatively, since bursts are switched therebetween within a time slot, an SC signal can be detected by carrier sense.

The present invention has been described with reference to the embodiment. The embodiment is intended to be illustrative only, and it will be obvious to those skilled in the art that various modifications to constituting elements or processes could be developed and that such modifications also fall within the scope of the present invention.

In the embodiment of the present invention, the communication system 20 uses one burst by switching two bursts that are discontinuous on the frequency axis. However, applications are not limited thereto, and the communication system 20 may use, for example, one or more continuous bursts by switching three or more bursts that include discontinuous bursts. When SC2, SC4, and SC5 are assigned, for example, SC2 may be used in a certain frame, and SC4 and SC5 may be used in another frame. Namely, continuous subchannels are regarded as one subchannel. Alternatively, SC2 may be used in a certain frame, SC4 may be used in another frame, and SC5 may be used in yet another frame. Thus, this modification allows greater flexibility in burst assignment.

INDUSTRIAL APPLICABILITY

The present invention enables the detection of a single carrier signal by carrier sense when a terminal apparatus dealing with such a single carrier signal is assigned to discontinuous subchannels.

The invention claimed is:

1. A base station apparatus, comprising:
a control unit adapted for a system in which multiple time slots for downlink communication and multiple time slots for uplink communication are time-division multiplexed to form a frame, and configured to define, in each time slot, a plurality of frequency-division multiplexed subchannels and to assign, to each frame destined to at least one terminal apparatus, two or more subchannels having the same frequency in a time slot for downlink communication and in a time slot for uplink communication; and
a communication unit configured to transmit a multicarrier signal to a terminal apparatus on a subchannel assigned in the time slot for downlink communication by the control unit, and to receive a single carrier signal from a terminal apparatus on a subchannel assigned in the time slot for uplink communication by the control unit,
wherein the control unit assigns two or more subchannels in the time slot for downlink communication and in the time slot for uplink communication so as to include subchannels that are discontinuous in a direction of a free axis, and
wherein the communication unit concurrently uses the two or more subchannels in the time slot for downlink communication, and uses, in the time slot for uplink communication, one of the subchannels that are discontinuous in the direction of frequency axis, switching between the subchannels frame by frame.

2. A terminal apparatus, adapted for a system in which multiple time slots for downlink communication and multiple time slots for uplink communication are time-division multiplexed to form a frame, for which a plurality of frequency-division multiplexed subchannels are defined in each time slot and two or more subchannels having the same frequency in a time slot for downlink communication and in a time slot for uplink communication are assigned to each frame by a base station apparatus, the terminal apparatus comprising:
a receiver configured to receive a multicarrier signal from a base station apparatus on a subchannel assigned in the time slot for downlink communication;
a transmitter configured to transmit a single carrier signal to a base station apparatus on a subchannel assigned in the time slot for uplink communication; and
a control unit configured to use concurrently the two or more subchannels in the time slot for downlink communication, and use, in the time slot for uplink communication, one of the subchannels that are discontinuous in the direction of frequency axis, switching between the subchannels frame by frame, wherein two or more subchannels are assigned in the time slot for downlink communication and in the time slot for uplink communication so as to include subchannels that are discontinuous in a direction of a frequency axis.

3. A communication method adapted for a system in which multiple time slots for downlink communication and multiple time slots for unlink communication are time-division multiplexed to form a frame, comprising:
defining, in each time slot, a plurality of frequency-division multiplexed subchannels and assigning, to each frame destined to at least one terminal apparatus, two or more subchannels having the same frequency in a time slot for downlink communication and in a time slot for uplink communication;
transmitting a multicarrier signal to a terminal apparatus on a subchannel assigned in the time slot for downlink communication; and
receiving a single carrier signal from a terminal apparatus on a subchannel assigned in the time slot for uplink communication,
wherein the assigning assigns two or more subchannels in the time slot for downlink communication and in the time slot for uplink communication so as to include subchannels that are discontinuous in a direction of a frequency axis,
wherein the transmitting concurrently uses the two or more subchannels in the time slot for downlink communication, and
wherein the receiving uses, in the time slot for uplink communication, one of the subchannels that are discontinuous in the direction of frequency axis, switching between the subchannels frame by frame.

4. A communication method adapted for a system in which multiple time slots for downlink communication and multiple time slots for uplink communication are time-division multiplexed to form a frame, and in which a plurality of frequency-division multiplexed subchannels are defined in each time slot, and two or more subchannels having the same frequency in a time slot for downlink communication and in a time slot for uplink communication are assigned to each frame by a base station apparatus, the communication method comprising:
receiving a multicarrier signal from a base station apparatus on a subchannel assigned in the time slot for downlink communication; and
transmitting a single carrier signal to a base station apparatus on a subchannel assigned in the time slot for uplink communication,
wherein two or more subchannels are assigned in the time slot for downlink communication and in the time slot for uplink communication so as to include subchannels that are discontinuous in a direction of a frequency axis, and the receiving concurrently uses the two or more subchannels in the time slot for downlink communication, and
wherein the transmitting uses, in the time slot for uplink communication, one of the subchannels that are discontinuous in the direction of frequency axis, switching between the subchannels frame by frame.

* * * * *